(12) United States Patent
Nakaoka et al.

(10) Patent No.: US 12,521,286 B2
(45) Date of Patent: Jan. 13, 2026

(54) DISPOSABLE ABSORBENT PRODUCT

(71) Applicant: LIVEDO CORPORATION, Ehime (JP)

(72) Inventors: Kenji Nakaoka, Tokushima (JP); Masatoshi Ikeuchi, Tokushima (JP)

(73) Assignee: LIVEDO CORPORATION, Ehime (JP)

( * ) Notice: Subject to any disclaimer, the term of this patent is extended or adjusted under 35 U.S.C. 154(b) by 380 days.

(21) Appl. No.: 18/028,884

(22) PCT Filed: Jun. 1, 2021

(86) PCT No.: PCT/JP2021/020856
§ 371 (c)(1),
(2) Date: Mar. 28, 2023

(87) PCT Pub. No.: WO2022/070509
PCT Pub. Date: Apr. 7, 2022

(65) Prior Publication Data
US 2023/0329925 A1    Oct. 19, 2023

(30) Foreign Application Priority Data

Oct. 2, 2020   (JP) .................................. 2020-167619

(51) Int. Cl.
*A61F 13/496*   (2006.01)
*A61F 13/49*    (2006.01)

(52) U.S. Cl.
CPC .... *A61F 13/4963* (2013.01); *A61F 13/49019* (2013.01); *A61F 2013/49087* (2013.01); *A61F 2013/49092* (2013.01)

(58) Field of Classification Search
CPC ...... A61F 13/49019; A61F 2013/49087; A61F 2013/49092; A61F 13/4963
See application file for complete search history.

(56) References Cited

U.S. PATENT DOCUMENTS 6,713,159 B1 *   3/2004   Blenke ................. B29C 66/431
                                                    442/394
2008/0140038 A1 * 6/2008   Sasayama ........... A61F 13/4963
                                                    604/385.01
(Continued)

FOREIGN PATENT DOCUMENTS

CN        104010612       8/2014
CN        205379412       7/2016
(Continued)

OTHER PUBLICATIONS

International Search Report (ISR) issued Jul. 27, 2021 in International (PCT) Application No. PCT/JP2021/020856.
(Continued)

*Primary Examiner* — Susan S Su
(74) *Attorney, Agent, or Firm* — Wenderoth, Lind & Ponack, L.L.P.

(57) ABSTRACT

A disposable absorbent product includes first welds that slope downward toward an outer side in a width direction, second welds that slope downward toward the outer side in the width direction, and third welds that slope upward toward the outer side in the width direction. A weld group includes one first weld, one second weld, and one third weld that are adjacent to each other in the width direction. An upper end of the third weld is located downward with respect to an upper end of the second weld, the upper end of the second weld is located downward with respect to an upper end of the first weld, a lower end of the second weld is located downward with respect to a lower end of the first weld, and an extension line extending outward in the width direction from the second weld intersects with the third weld.

11 Claims, 6 Drawing Sheets

(56) References Cited

U.S. PATENT DOCUMENTS

2012/0278975 A1* 11/2012 Yamashita ........ A61F 13/49466
2/400
2017/0049639 A1 2/2017 Shimazu et al.

FOREIGN PATENT DOCUMENTS

| JP | 3069885 | 7/2000 |
| JP | 2002-11043 | 1/2002 |
| JP | 2003-144494 | 5/2003 |
| JP | 2013-106912 | 6/2013 |
| JP | 2015-208534 | 11/2015 |
| JP | 2016-220771 | 12/2016 |

OTHER PUBLICATIONS

Extended European Search Report issued Sep. 3, 2024 in European Patent Application No. 21874815.0.
International Preliminary Report on Patentability issued Mar. 28, 2023 in International (PCT) Application No. PCT/JP2021/020856, with English language translation.
Notification of Transmittal of Translation of the International Preliminary Report on Patentability dated Apr. 13, 2023 in International (PCT) Application No. PCT/JP2021/020856.
Office Action dated Jul. 9, 2025 in Chinese Patent Application No. 202180066508.X, with English Translation.

\* cited by examiner

DISPOSABLE ABSORBENT PRODUCT

CROSS-REFERENCE TO RELATED APPLICATIONS

This application claims priority benefit of Japanese Patent Application No. JP2020-167619 filed in the Japan Patent Office on Oct. 2, 2020, the entire disclosure of which is incorporated herein by reference.

TECHNICAL FIELD

The present invention relates to a pants-type disposable absorbent product.

BACKGROUND ART

Pants-type disposal diapers having a waist opening at the upper end and a pair of leg openings at the bottom have conventionally been used as one type of absorbent product for receiving body wastes discharged from a wearer. The disposable diapers ordinarily have pants shapes formed by overlaying both sides of the front part of an outer covering sheet on both sides of the rear part of the outer covering sheet and bonding them together.

In the case of helping a wearer out of such a pants-type absorbent product, typically both sides (i.e., side seals) of the outer covering sheet are torn off from the wait opening to the bottom to separate the front part and the rear part from each other. When the both sides are torn off, it is preferable that the tearing force is easily transmitted downward so as to allow the both sides to be torn off continuously from the waist opening to the leg openings. In view of this, it has been proposed to devise the shape of a weld pattern provided on the both sides so as to facilitate the tearing of the both sides of the outer covering sheet.

For example, according to Japanese Patent Application Publication No. 2015-208534, different weld patterns are aligned in inner, middle, and outer regions of the lateral ends of the pants-type absorbent product. Specifically, in the inner region, each weld slopes downward toward the outer side in the lateral direction. In the outer region, each weld slopes upward toward the outer side in the lateral direction. The middle region includes welds that slope downward toward the outer side in the lateral direction and welds that slope upward toward the outer side in the lateral direction, and both welds are alternately arranged in the longitudinal direction. This allows the force of tearing off the lateral ends to be guided downward along the boundary between the welds and the surrounding area, thereby facilitating the tearing of the lateral ends.

According to the pants-type absorbent product disclosed in Japanese Patent Application Publication No. 2015-208534, the amount of clearance between the welds aligned in the longitudinal direction in the inner region from which the tearing of the lateral ends starts is greater than those in the middle and outer regions. This may decrease the bonding strength in the inner regions of the lateral ends and raise the possibility that the lateral ends may be torn off in the vicinity of the waist opening against intension by forces applied by wearer's motion or any other factor. Moreover, in the outer region, each weld has a small angle of slope to the lateral direction. Thus, the tearing of the lateral ends, which is guided downward along the welds in the middle region toward the outer side in the lateral direction, may deviate toward the outer side in the lateral direction and reach the outer edges of the lateral ends in the outer region. This may interrupt the tearing of the lateral ends.

SUMMARY OF THE INVENTION

The present invention is intended for a pants-type disposable absorbent product having a waist opening at the upper end and a pair of leg openings at the bottom, and it is an object of the present invention to facilitate the tearing of side seals from the upper end toward the bottom.

A disposable absorbent product according to one preferable embodiment of the present invention includes a front part that is positioned on a belly side of a wearer, a rear part that is positioned on a back side of the wearer, a crotch part contiguous to the front part and the rear part, and a pair of side seals each being a strip area extending in an up-down direction, the pair of side seals being formed by bonding both ends in a width direction of the front part and both ends in the width direction of the rear part together. Each of the pair of side seals includes a first region that is a strip region extending in the up-down direction and includes a plurality of first welds aligned away from one another in the up-down direction, a second region that is a strip region extending in the up-down direction and arranged adjacent to and outward of the first region in the width direction, the second region including a plurality of second welds aligned away from one another in the up-down direction, and a third region that is a strip region extending in the up-down direction and arranged adjacent to and outward of the second region in the width direction, the third region including a plurality of third welds aligned away from one another in the up-down direction. The plurality of first welds, the plurality of second welds, and the plurality of third welds are discontinuous. Each of the plurality of first welds extends parallel to the width direction or slopes downward toward an outer side in the width direction. Each of the plurality of second welds slopes downward toward the outer side in the width direction. Each of the plurality of third welds slopes upward toward the outer side in the width direction. When one first weld, one second weld, and one third weld that are adjacent to one another in the width direction forms one weld group, each of the pair of side seals includes a plurality of weld groups aligned in the up-down direction, the one first weld being among the plurality of first welds, the one second weld being among the plurality of second welds, the one third weld being among the plurality of third welds. In each of the plurality of weld groups, an upper end of the third weld is located downward of an upper end of the second weld, the upper end of the second weld is located downward of an upper end of the first weld, a lower end of the second weld is located downward of a lower end of the first weld, and an extension line extending outward in the width direction from the second weld intersects with the third weld.

This disposable absorbent product allows the side seals to be torn off with ease from the upper end toward the bottom.

Preferably, in each of the plurality of weld groups, an acute angle formed by the second weld and the width direction may be greater than an acute angle formed by the first weld and the width direction.

Preferably, in each of the plurality of weld groups, an acute angle formed by the third weld and the width direction may be greater than an acute angle formed by the second weld and the width direction.

Preferably, in each of the plurality of weld groups, an extension line extending outward in the width direction from the first weld may intersect with the second weld.

Preferably, in each weld group among the plurality of weld groups, an extension line extending inward in the width direction from the third weld may intersect with the second weld included in a different weld group that is adjacent below to the each weld group, the different weld group being among the plurality of weld groups.

Preferably, in each of the plurality of weld groups, the upper end of the second weld may be located at the same position in the up-down direction as the lower end of the first weld, or located upward of the lower end of the first weld.

Preferably, an end portion in the width direction of an elastic member may pass between the lower end of the first weld and the upper end of the second weld in one weld group among the plurality of weld groups, the elastic member being bonded to the front part or the rear part in the width direction and contracting to form a gather.

Preferably, in each of the plurality of weld groups, the upper end of the third weld may be located at the same position in the up-down direction as the lower end of the second weld, or located upward of the lower end of the second weld.

Preferably, in each weld group among the plurality of weld groups, a lower end of the third weld may be located at the same position in the up-down direction as the upper end of the first weld in a different weld group that is adjacent below to the each weld group, or located downward of the upper end of the first weld in the different weld group, the different weld group being among the plurality of weld groups.

Preferably, a non-welded region that extends continuously in the up-down direction may be provided in the width direction between the plurality of first welds and the plurality of second welds and between the plurality of second welds and the plurality of third welds.

Preferably, the plurality of first welds may be aligned at a constant pitch in the up-down direction, the plurality of second welds may be aligned at a constant pitch in the up-down direction, and the plurality of third welds may be aligned at a constant pitch in the up-down direction.

Preferably, in the pair of side seals, the plurality of first welds in one side seal and the plurality of first welds in the other side seal may be alternately arranged in the up-down direction, the plurality of second welds in the one side seal and the plurality of second welds in the other side seal may be alternately arranged in the up-down direction, and the plurality of third welds in the one side seal and the plurality of third welds in the other side seal may be alternately arranged in the up-down direction.

These and other objects, features, aspects and advantages of the present invention will become more apparent from the following detailed description of the present invention when taken in conjunction with the accompanying drawings.

DESCRIPTION OF EMBODIMENTS

Figure 1:
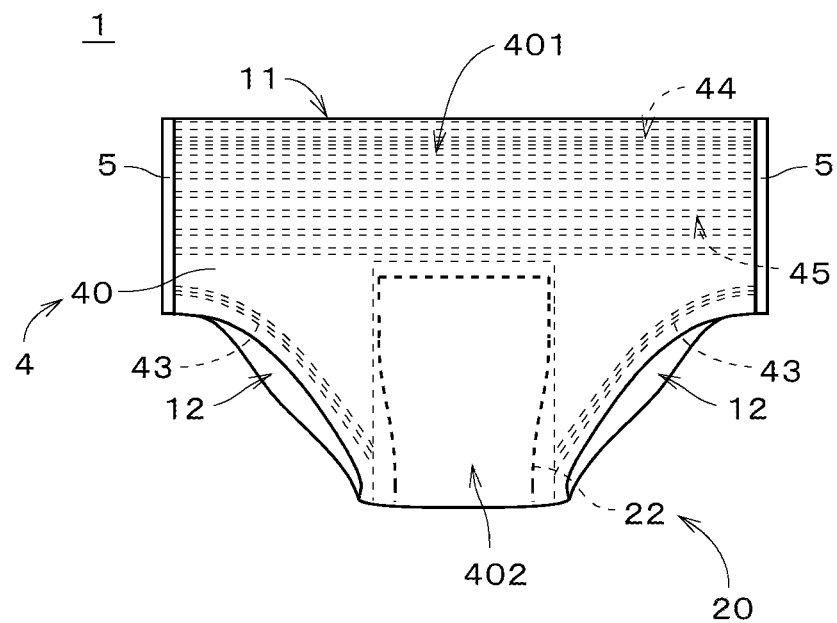
FIG. 1 is a front view of an absorbent product according to one embodiment.
Figure 2:
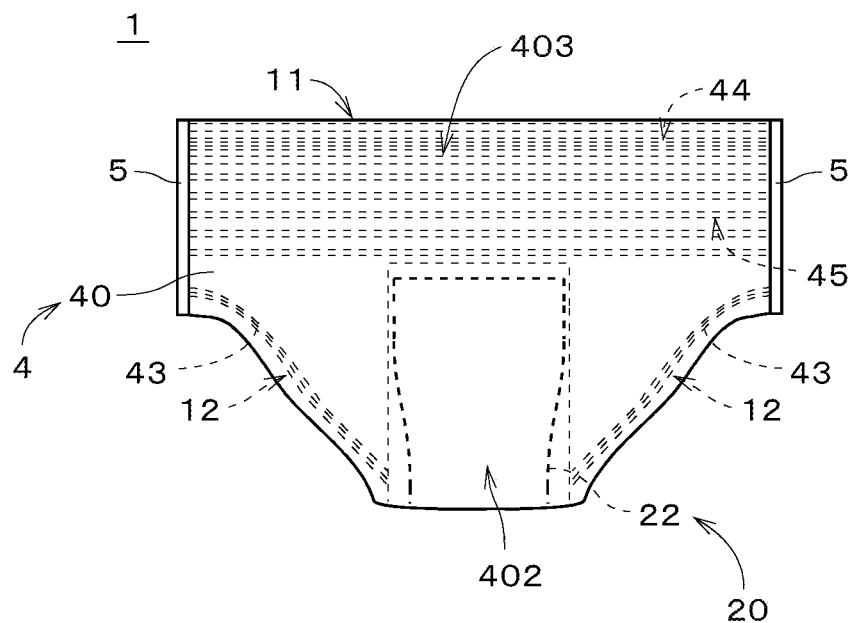
FIG. 2 is a rear view of the absorbent product.

FIGS. 1 and 2 are respectively front and rear views of a disposal absorbent product 1 according to one aspect of the present invention (i.e., a view of areas positioned on the wearer's belly side and back side). In the following description, the disposable absorbent product 1 is simply referred to as the "absorbent product 1." The up-down direction and the right-left direction in FIGS. 1 and 2 are also simply referred to as the "up-down direction" and the "right-left direction." The right-left direction corresponds to a right-left direction when the absorbent product 1 is worn by the wearer. In the following description, the right-left direction is also referred to as the "width direction."

As illustrated in FIGS. 1 and 2, the absorbent product 1 is a pants-type absorbent product having a waist opening 11 at the upper end (i.e., the end on the upper side in FIGS. 1 and 2) and a pair of leg openings 12 at the bottom. The absorbent product 1 may, for example, be a disposable diaper for adults. The absorbent product 1 is worn by a wearer to receive body wastes from the wearer.

Figure 3:
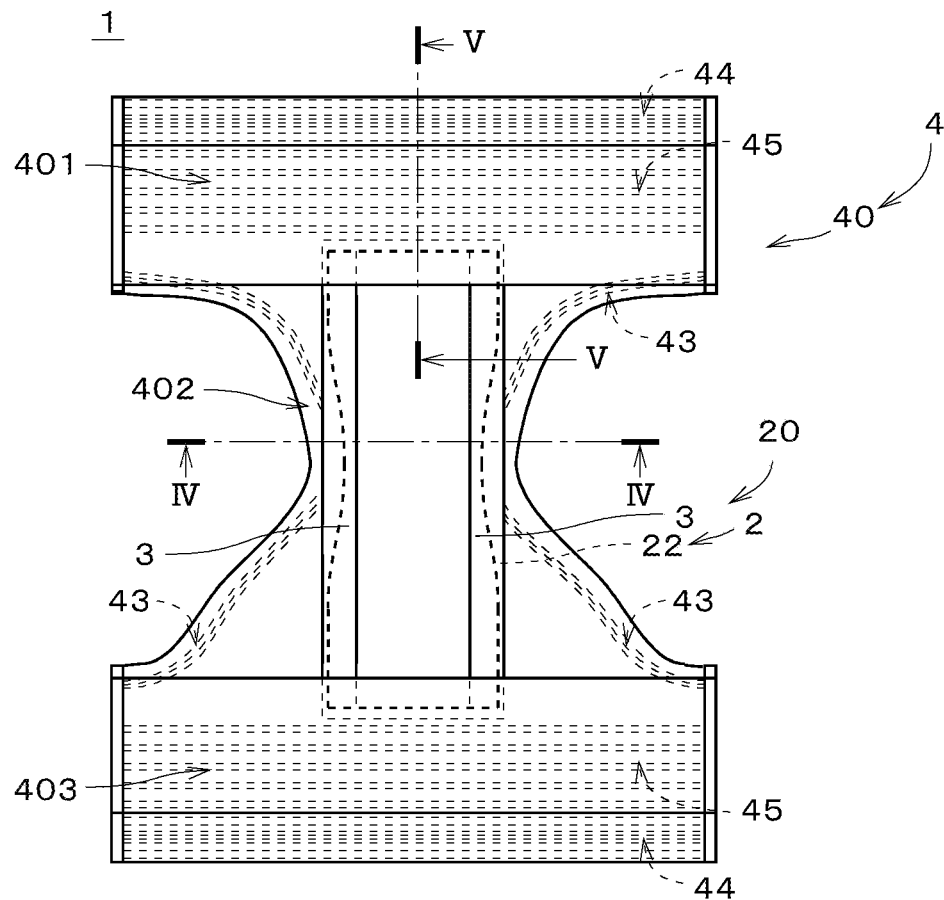
FIG. 3 is a developed plan view of the absorbent product.

FIG. 3 is a developed plan view of the absorbent product 1 as viewed from the wearer's side. The absorbent product 1 includes an outer covering sheet 4 and an absorber 20. In the example illustrated in FIG. 3, the absorber 20 has an approximately rectangular shape in plan view. The shape of the absorber 20 in plan view may be appropriately changed. The outer covering sheet 4 has the waist opening 11 and the pair of leg openings 12 (see FIGS. 1 and 2). The absorber 20 is attached to the inner surface (i.e., the surface on the wearer's side) of the outer covering sheet 4. The absorber 20 is an approximately sheet member that absorbs body wastes received from the wearer.

In the absorbent product 1, the area on the upper side in FIG. 3 covers the wearer's front side (i.e., skin on the belly side), and the area on the lower side in FIG. 3 covers the wearer's back side (i.e., skin on the back side). In the following description, the areas of the absorbent product 1 positioned on the wearer's belly side and back side are respectively referred to as a "front part 401" and a "rear part 403." In the absorbent product 1, the area between the front part 401 and the rear part 403 is referred to as a "crotch part 402." The crotch part 402 is contiguous to the front part 401 and the rear part 403. The crotch part 402 covers the wearer's groin part. The front part 401, the crotch part 402, and the rear part 403 of the absorbent product 1 also correspond to the front part, the crotch part, and the rear part of the outer covering sheet 4. In other words, the outer covering sheet 4 includes the front part 401, the crotch part 402, and the rear part 403. The absorber 20 extends from the front part 401 of the outer covering sheet 4 through the crotch part 402 to the rear part 403.

In the manufacture of the absorbent product 1, the outer covering sheet 4 is folded with the absorber 20 at the crotch part 402. Then, the inner surfaces of both ends in the right-left direction of the front part 401 of the outer covering sheet 4 are bonded to the inner surfaces of both ends in the right-left direction of the rear part 403 so as to form a pair of side seals 5. This forms the waist opening 11 at the upper ends of the front part 401 and the rear part 403 as illustrated in FIGS. 1 and 2. This also forms the pair of leg openings 12 on the right and left sides of the crotch part 402 below the front part 401 and the rear part 403.

Each side seal 5 is a strip area extending in the up-down direction. In the example illustrated in FIGS. 1 and 2, each side seal 5 has an approximately rectangular shape that is long in the up-down direction. As will be described below, each side seal 5 is formed by compression bonding using an anvil roll provided with a weld pattern. The side seals 5 may be bonded by, for example, ultrasonic sealing or heat sealing.

Figure 4:
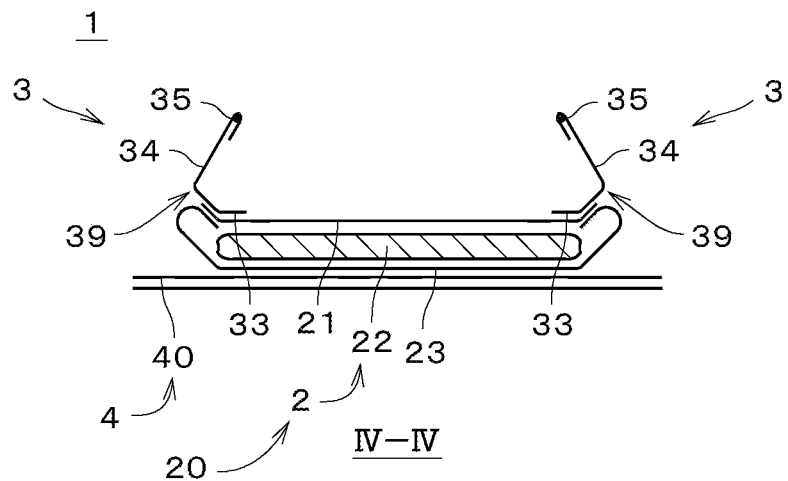
FIG. 4 is a sectional view of the absorbent product.

FIG. 4 is a sectional view of the absorbent product 1 taken at a position IV-IV (i.e., the crotch part 402) in FIG. 3. For convenience in illustration, constituent elements of the absorbent product 1 are illustrated separately from one another in FIG. 4. As illustrated in FIGS. 3 and 4, the absorber 20 includes a main body part 2 and a pair of side sheets 3. The pair of side sheets 3 is arranged on both side portions of the main body part 2 (i.e., both sides in the right-left direction perpendicular to the up-down direction). Each side sheet 3 is an approximately sheet member extending along the overall length in the longitudinal direction of the main body part 2 (i.e., in the direction parallel to the up-down direction when the absorbent product is worn).

The main body part 2 is an approximately sheet member and includes a top sheet 21, a back sheet 23, and an absorbent core 22. The top sheet 21 is a liquid-permeable sheet member. The back sheet 23 is a liquid-impermeable or liquid-repellent sheet member. The absorbent core 22 is an approximately sheet member arranged between the top sheet 21 and the back sheet 23. The top sheet 21 covers the surface of the absorbent core 22 on the wearer's side. The back sheet 23 covers the surface of the absorbent core 22 on the side opposite to the wearer.

The top sheet 21 captures moisture in the body wastes received from the wearer and allows the moisture to move to the absorbent core 22. The absorbent core 22 absorbs and fixes the moisture permeated through the top sheet 21 (i.e., the moisture in the body wastes received from the wearer). The back sheet 23 prevents the moisture or the like in the body wastes that have reached the back sheet 23 from leaking out of the main body part 2.

To facilitate understanding of the illustration, the contour of the absorbent core 22 of the absorber 20 is illustrated by the bold broken line in FIG. 3. The same applies to FIGS. 1 and 2. As illustrated in FIG. 3, the width of the absorbent core 22 at the both ends in the longitudinal direction is greater than the width of the absorbent core 22 at the central portion in the longitudinal direction. In other words, the absorbent core 22 has a so-called hourglass shape in plan view. The back sheet 23 illustrated in FIG. 4 is bonded to the outer covering sheet 4 with a hot-melt adhesive or the like. In this way, the absorber 20 is fixed to the outer covering sheet 4. The shape of the absorbent core 22 in plan view may be appropriately changed.

Each of the pair of side sheets 3 includes a bonded part 33 and a side-wall part 34. The bonded part 33 is a strip area of the side sheet 3 on one side of a folding line 39 provided along the overall length in the longitudinal direction. The bonded part 33 is bonded with a hot-melt adhesive or the like to the upper side (i.e., the wearer's side) of the main body part 2 along approximately the overall length in the longitudinal direction in the vicinity of the side edge of the main body part 2. The side wall part 34 is a strip area of the side sheet 3 on the other side of the folding line 39. The side wall part 34 is an area that is contiguous to each of the pair of bonded parts 33 along the folding line 39 (i.e., the outer edge in the right-left direction of the bonded part 33). The side wall part 34 extends along approximately the overall length in the longitudinal direction of the main body part 2 on both sides of the main body part 2.

Each side wall part 34 is overlaid on the bonded part 33 and fixed to the bonded part 33 at both ends in the longitudinal direction. The fixation of the side wall parts 34 and the bonded parts 33 may be implemented by heat sealing, ultrasonic sealing, or bonding with a hot-melt adhesive or the like. The other portion of each side wall part 34 (i.e., the central portion in the longitudinal direction), except the both ends in the longitudinal direction, is not bonded to the bonded part 33 and is separable from the bonded part 33. The free edge of each side wall part 34 is bonded to a side-wall elastic member 35. Contraction of the side-wall elastic member 35 causes the central portion of the side wall part 34 in the longitudinal direction to stand up and form standing gathers. This reduces the possibility that body wastes received by the absorber 20 between the pair of side wall parts 34 may leak out of the pair of side wall parts 34. Note that the shape and structure of the pair of side sheets 3 may be changed in various ways. As another alternative, the pair of side sheets 3 may be omitted.

The top sheet 21 may be formed of, for example, liquid-permeable nonwoven fabric (e.g., air-through nonwoven fabric, point-bonded nonwoven fabric, spun-bonded nonwoven fabric, or spun lace nonwoven fabric). The nonwoven fabric may be formed of, for example, hydrophobic fiber whose surface has undergone hydrophilic treatment using a surface-active agent (e.g., polypropylene, polyethylene, polyester, polyamide, or nylon). Alternatively, the nonwoven fabric may be formed of hydrophilic fiber such as cellulose, rayon, or cotton.

The absorbent core 22 may include, for example, at least either a particulate or fibrous high absorbent material or an aggregate of hydrophilic fiber as an absorber. Examples of the high absorbent material include particulate high-absorbent polymer (super absorbent polymer (SAP)) and fibrous high-absorbent fiber (super absorbent fiber (SAF)). The aggregate of hydrophilic fiber may be formed of, for example, pulverized pulp fiber or cellulose fiber.

In the example illustrated in FIG. 4, the absorbent core 22 is formed by mixing particulate SAP with the aforementioned aggregate of hydrophilic fiber and wrapping the mixture in, for example, tissue paper or liquid-permeable nonwoven fabric. This prevents deformation of the aggregate of hydrophilic fiber and falling off of the SAP (in particular, falling off after liquid absorption).

The back sheet 23 may be formed of, for example, liquid-impermeable or liquid-repellent nonwoven fabric formed of hydrophobic fiber (e.g., spun-bonded nonwoven fabric, melt-blown nonwoven fabric, or spun-bonded-melt-blown-spun-bonded (SMS) nonwoven fabric). Alternatively, the back sheet 23 may be formed of liquid-impermeable or liquid-repellent plastic film. The back sheet 23 may also be a laminate of such nonwoven fabric and such plastic film. When plastic film is used as the back sheet 23, it is preferable to use plastic film having moisture permeability (i.e., air permeability), from the viewpoint of preventing stuffiness inside the absorbent product 1 and improving the wearer's comfortability.

The sheet body of the side sheet 3 is formed of liquid-impermeable or liquid-repellent nonwoven fabric formed of hydrophobic fiber (e.g., spun-bonded nonwoven fabric, melt-blown nonwoven fabric, or SMS nonwoven fabric).

Examples of the side-wall elastic member 35 include polyurethane yarn, strip polyurethane film, and filiform- or strip-shaped natural rubber. In the present embodiment, polyurethane yarn is used as the side-wall elastic member 35.

The outer covering sheet 4 includes an outer covering sheet body 40, leg elastic members 43, a waist elastic member 44, and an intermediate elastic member 45. The leg elastic members 43, the waist elastic member 44, and the intermediate elastic member 45 are bonded to the outer covering sheet body 40. Specifically, the outer covering sheet body 40 has such a structure that a plurality of sheet members are laminated one above another. The leg elastic members 43, the waist elastic member 44, and the intermediate elastic member 45 are bonded between the sheet members with a hot-melt adhesive or the like.

Like the back sheet 23, the sheet members of the outer covering sheet body 40 are formed of liquid-impermeable or liquid-repellent nonwoven fabric formed of hydrophobic fiber (e.g., spun-bonded nonwoven fabric, melt-blown nonwoven fabric, or SMS nonwoven fabric). Alternatively, the sheet members may be a laminate of the aforementioned nonwoven fabric and liquid-impermeable or liquid-repellent plastic film. It is preferable that the plastic film may have moisture permeability. Like the top sheet 21, liquid-permeable nonwoven fabric may be used as the sheet members.

The leg elastic members 43 are arranged along the edges of the pair of leg openings 12. Examples of the leg elastic member 43 include polyurethane yarn, strip polyurethane film, and filiform- or strip-shaped natural rubber. In the example illustrated in FIGS. 1 and 2, the leg elastic member 43 includes a plurality of leg elastic elements each being polyurethane yarn. The leg elastic elements are arranged approximately parallel to one another. The upper end portions of the leg elastic member 43 are located at the front part 401 and the rear part 403 of the outer covering sheet 4. The portion of each leg elastic member 43 other than the upper end portions is located at the crotch part 402 of the outer covering sheet 4. In the absorbent product 1, contraction of the leg elastic members 43 causes the outer covering sheet body 40 to contract in the vicinity of the pair of leg openings 12 and form a pair of leg gathers (i.e., a pair of leg opening gathers) that come in contact with skin around the wearer's legs.

The waist elastic member 44 is bonded to the front part 401 and the rear part 403 along the edge of the waist opening 11. The waist elastic member 44 is provided along approximately the overall lengths of the front part 401 and the rear part 403 in the right-left direction. Examples of the waist elastic member 44 include polyurethane yarn, strip polyurethane film, and filiform- or strip-shaped natural rubber. In the example illustrated in FIGS. 1 and 2, the waist elastic member 44 includes a plurality of waist elastic elements each being polyurethane yarn. The waist elastic elements extend in approximately parallel with the right-left direction. In the absorbent product 1, contraction of the waist elastic member 44 causes the outer covering sheet body 40 to contract in the vicinity of the waist opening 11 and form waist gathers (i.e., waist opening gathers) that come in contact with skin around the wearer's waist.

The intermediate elastic member 45 is bonded to the front part 401 and the rear part 403 in a region between the upper ends of the leg elastic members 43 and the waist elastic member 44 in the up-down direction. The intermediate elastic member 45 is provided along approximately the overall length of the front part 401 and the rear part 403 in the right-left direction. Examples of the intermediate elastic member 45 include polyurethane yarn, strip polyurethane film, and filiform- or strip-shaped natural rubber. The intermediate elastic member 45 includes a plurality of intermediate elastic elements each being polyurethane yarn. These intermediate elastic elements extend approximately parallel to one another in the right-left direction. In the absorbent product 1, contraction of the intermediate elastic member 45 causes the outer covering sheet body 40 to contract and form body fitness gathers (i.e., intermediate gathers) that come in contact with the wearer's lower abdomen and hip. Note that the intermediate elastic member 45 may overlap the absorber 20, or may not overlap the absorber 20.

Figure 5:
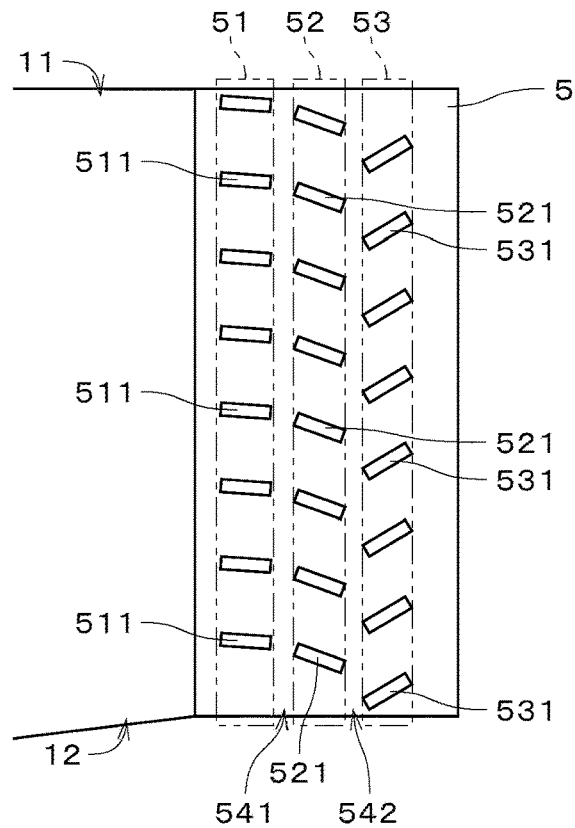
FIG. 5 is an enlarged front view of one side seal.

FIG. 5 is an enlarged front view of the right side seal 5 in FIG. 1. In the illustration in FIG. 5, the width in the right-left direction of the side seal 5 (i.e., width direction) is greater than the actual width with respect to the length in the up-down direction.

The side seal 5 includes a first region 51, a second region 52, and a third region 53. In FIG. 5, the first region 51, the second region 52, and the third region 53 are each indicated by being enclosed in a rectangular frame drawn with a chain double-dashed line. Each of the first region 51, the second region 52, and the third region 53 is an approximately rectangular strip region extending in the up-down direction.

The first region 51 of the side seal 5 is located most inward in the width direction. The second region 52 is located adjacent to and outward of the first region 51 in the width direction. The third region 53 is located adjacent to and outward of the second region 52 in the width direction. In the side seal 5, the third region 53 is located most outward in the width direction. That is, the first region 51, the second region 52, and the third region 53 are arranged in the order specified in the width direction from the inner side (i.e., the side closer to the waist opening 11 and the leg openings 12 in the width direction) to the outer side in the width direction.

The first region 51 includes a plurality of first welds 511 aligned away from one another in the up-down direction. The second region 52 includes a plurality of second welds 521 aligned away from one another in the up-down direction. The third region 53 includes a plurality of third welds 531 aligned away from one another in the up-down direction. The first welds 511, the second welds 521, and the third welds 531 are areas where the front part 401 and the rear part 403 (see FIGS. 1 and 2) of the outer covering sheet 4 are welded to each other (i.e., weld marks). To facilitate understanding of the drawing in FIG. 5, the first welds 511, the second welds 521, and the third welds 531 are illustrated larger than their actual size, and the numbers of the first welds 511, the second welds 521, and the third welds 531 are illustrated smaller than the actual numbers.

The first welds 511 each slope downward toward the outer side in the width direction. In the example illustrated in FIG. 5, each first weld 511 has a long slender and approximately rectangular shape extending approximately linearly and obliquely downward to the right in the drawing from the inner edge in the width direction (hereinafter, also simply referred to as the "inner edge"). The inner edge of the first weld 511 means the side (i.e., short side) of the first weld 511 located inward in the width direction. The same applies to the inner edges of the second weld 521 and the third weld 531. The short sides of the first weld 511 may have a length of, for example, 0.1 mm to 1.0 mm and have a length of approximately 0.25 mm in the present embodiment. The long sides of the first weld 511 may have a length of, for example, 1.1 mm to 4.4 mm. For example, the length of the first weld 511 in the width direction (i.e., the right-left direction) may be in the range of 1.0 mm to 4.0 mm and approximately 1.9 mm or 2.9 mm in the present embodiment.

Each first weld 511 is arranged approximately parallel to first welds 511 that are adjacent to the first weld 511 concerned in the up-down direction. The first welds 511 are aligned at an approximately constant pitch in the up-down direction. For example, the pitch of the first welds 511 in the up-down direction may be a distance in the up-down direction between the upper ends of each pair of first welds 511 that are adjacent to each other in the up-down direction. This pitch may be in the range of, for example, 1.5 mm to 5.0 mm and approximately 2.0 mm or 3.0 mm in the present embodiment. The upper end of each first weld 511 means the portion of the first weld 511 that is closest to the waist opening 11 in the up-down direction. The same applies to the upper ends of the second welds 521 and the third welds 531. In the example illustrated in FIG. 5, the upper end of each first weld 511 is a vertex that is the upper end of the inner edge of the first weld 511.

The lower end of each first weld 511 means the portion of the first weld 511 that is located farthest from the waist opening 11 in the up-down direction. The same applies to the lower ends of the second welds 521 and the third welds 531. In the example illustrated in FIG. 5, the lower end of each first weld 511 is a vertex that is the lower end of the outer edge of the first weld 511 in the width direction (hereinafter, also simply referred to as the "outer edge"). The outer edge of the first weld 511 means the side of the first weld 511 that is located outward in the width direction (i.e., short side). The same applies to the outer edges of the second weld 521 and the third weld 531.

In the absorbent product 1, each of the first welds 511 may extend approximately linearly and approximately parallel to the width direction. In this case as well, the upper end of each first weld 511 indicates the upper end of the inner edge of the first weld 511, and the lower end of each first weld 511 indicates the lower end of the outer edge of the first weld 511.

The inner edges of the first welds 511 are located at approximately the same position in the width direction. The outer edges of the first welds 511 are also located at approximately the same position in the width direction. Note that each first weld 511 may have any other shape such as an approximately oblong shape. Each first weld 511 may also be slightly curved so as to protrude upward or downward.

The second welds 521 each slope downward toward the outer side in the width direction. In the example illustrated in FIG. 5, each second weld 521 has a long slender and approximately rectangular shape extending approximately linearly and obliquely downward to the right in the drawing from the inner edge. The short sides of the second weld 521 may have a length of, for example, 0.1 mm to 1.0 mm and have a length of approximately 0.25 mm in the present embodiment. The long sides of the second weld 521 may have a length of, for example, 1.1 mm to 4.4 mm. For example, the length of the second weld 521 in the width direction (i.e., the right-left direction) may be in the range of 1.0 mm to 4.0 mm and approximately 1.5 mm in the present embodiment. Each second weld 521 is arranged approximately parallel to second welds 521 that are adjacent to the second weld 521 concerned in the up-down direction. The second welds 521 are aligned at an approximately constant pitch in the up-down direction. For example, the pitch of the second welds 521 in the up-down direction may be a distance in the up-down direction between the upper ends of each pair of second welds 521 that are adjacent to each other in the up-down direction. This pitch is approximately the same as the aforementioned pitch of the first welds 511.

The inner edges of the second welds 521 are located at approximately the same position in the width direction. The outer edges of the second welds 521 are also located at approximately the same position in the width direction. Note that each second weld 521 may have any other shape such as an approximately oblong shape. Each second weld 521 may also be slightly curved so as to protrude upward or downward.

The third welds 531 each slope upward toward the outer side in the width direction. In the example illustrated in FIG. 5, each third weld 531 has a long slender and approximately rectangular shape extending approximately linearly and obliquely upward to the right in the drawing from the inner edge. The short sides of the third welds 531 may have a length of, for example, 0.1 mm to 1.0 mm and have a length of approximately 0.25 mm in the present embodiment. The long sides of the third welds 531 may have a length of, for example, 1.1 mm to 4.4 mm. The lengths of the third welds 531 in the width direction (i.e., the right-left direction) may be in the range of, for example, 1.0 mm to 4.0 mm and approximately 1.5 mm in the present embodiment. Each third weld 531 is arranged approximately parallel to the third welds 531 that are adjacent to the third weld 531 concerned in the up-down direction. The third welds 531 are aligned at an approximately constant pitch in the up-down direction. For example, the pitch of the third welds 531 in the up-down direction may be a distance in the up-down direction between the upper ends of each pair of third welds 531 that are adjacent to each other in the up-down direction. This pitch is approximately the same as the aforementioned pitch of the first welds 511 and the aforementioned pitch of the second welds 521.

The inner edges of the third welds 531 are located at approximately the same position in the width direction. The outer edges of the third welds 531 are also located at approximately the same position in the width direction. Note that each third weld 531 may have any other shape such as an approximately oblong shape. Each third weld 531 may also be slightly curved so as to protrude upward or downward.

The first welds 511, the second welds 521, and the third welds 531 are discontinuous. In the example illustrated in FIG. 5, the first welds 511 and the second welds 521 are spaced from each other in the width direction. The second welds 521 and the third welds 531 are also spaced from each other in the width direction. In other words, a non-welded region 541 (i.e., a region where no welds are present) that extend continuously along approximately the overall length of the side seal 5 in the up-down direction is provided between the first welds 511 and the second welds 521 in the width direction. Also, anon-welded region 542 that extends continuously along approximately the overall length of the side seal 5 in the up-down direction is provided between the second welds 521 and the third welds 531 in the width direction. For example, the width of the non-welded region 541 in the width direction (i.e., the distance in the width direction between the upper end of the outer edge of the first weld 511 and the lower end of the inner edge of the second weld 521) may be in the range of 0.2 mm to 2.0 mm and approximately 0.5 mm in the present embodiment. For example, the width of the non-welded region 542 in the width direction (i.e., the distance in the width direction between the upper end of the outer edge of the second weld 521 and the upper end of the inner edge of the third weld 531) may be in the range of 0.2 mm to 2.0 mm and approximately 0.5 mm in the present embodiment.

Figure 6:
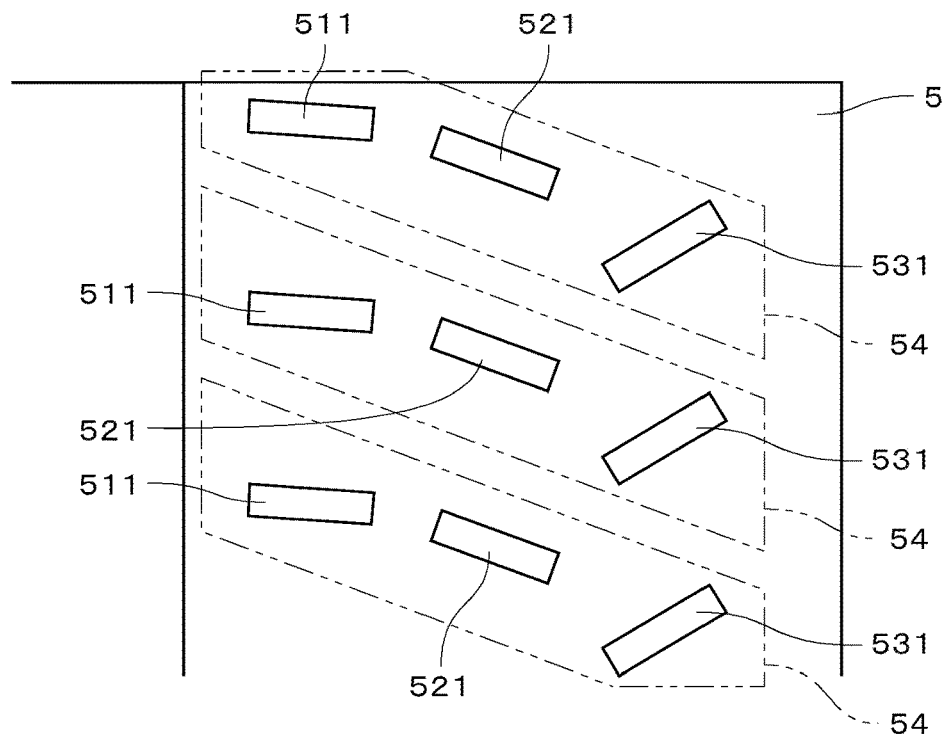
FIG. 6 is an enlarged view of the upper portion of the side seal.

FIG. 6 is an enlarged front view of the upper portion of the side seal 5 illustrated in FIG. 5. In the following description, one first weld 511, one second weld 521, and one third weld 531 that are adjacent to one another in the width direction are referred to as one weld group 54. Each side seal 5 includes a plurality of weld groups 54 aligned at an approximately constant pitch in the up-down direction. In FIG. 6, each weld group 54 is indicated by being enclosed by a chain double-dashed line. In each weld group 54, the first weld 511, the second weld 521, and the third weld 531 are arranged in the order specified, obliquely downward toward the outer side in the width direction. For example, the pitch of the weld groups 54 in the up-down direction may be a distance in the up-down direction between the upper ends of the first welds 511 in each pair of weld groups 54 that are adjacent to each other in the up-down direction. This pitch is approximately the same as the aforementioned pitch of the first welds 511. In the following description, the pitch of the weld groups 54 is also referred to as the "weld group pitch."

In each weld group 54, the upper end of the second weld 521 (i.e., the upper end of the inner edge) is located downward of the upper end of the first weld 511 (i.e., the upper end of the inner edge). The upper end of the second weld 521 is also located at approximately the same position in the up-down direction as the lower end of the first weld 511 (i.e., the lower end of the outer edge), or located upward of the lower end of the first weld 511. In the example illustrated in FIG. 6, the upper end of the second weld 521 is located upward of the lower end of the first weld 511. The lower end of the second weld 521 (i.e., the lower end of the outer edge) is located downward of the lower end of the first weld 511.

Figure 7:
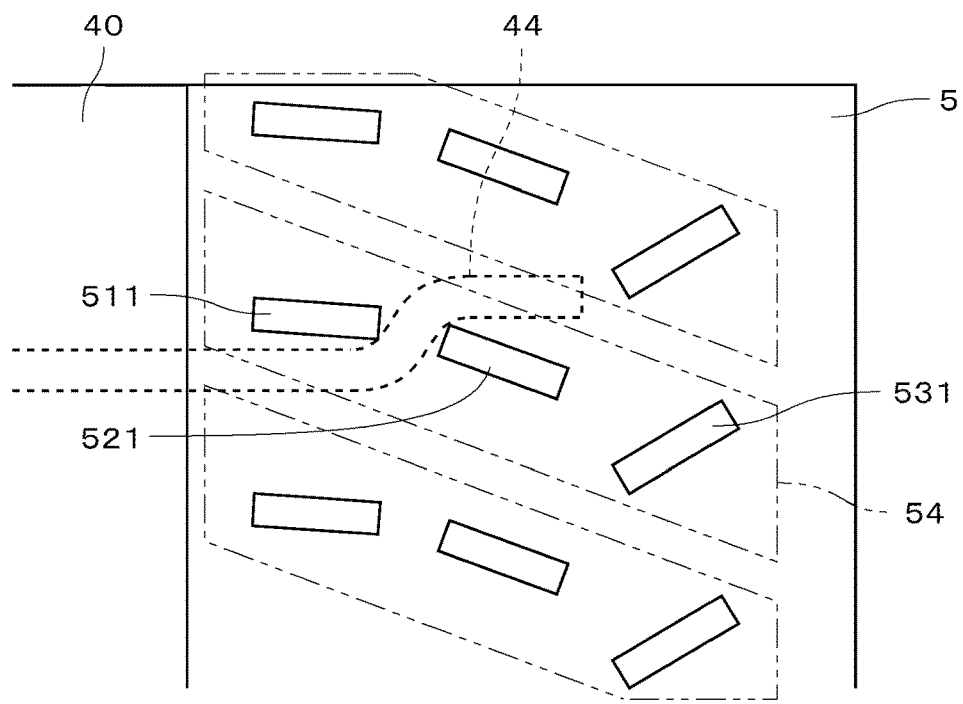
FIG. 7 is an enlarged view of the upper portion of the side seal.

In at least one weld group 54 of the side seal 5, as illustrated in FIG. 7, the end portion in the width direction of one waist elastic element (e.g., polyurethane yarn) of the waist elastic member 44 bonded to the front part 401 or the rear part 403 passes between the lower end of the first weld 511 (i.e., the lower end of the outer edge) and the upper end of the second weld 521 (i.e., the upper end of the inner edge). This end portion of the waist elastic element bends between the first weld 511 and the second weld 521 so as to be engaged with the first weld 511 and the second weld 521. Accordingly, even if the waist elastic element contracts in the width direction, the end portion of the waist elastic element is less prone to being disengaged inward in the width direction from the side seal 5. As a result, it is possible to suppress separation of the waist elastic element from the outer covering sheet body 40 and resultant contraction.

In at least one weld group 54 of the side seal 5, it is also preferable that the end portion in the width direction of one intermediate elastic element (e.g., polyurethane yarn) of the intermediate elastic member 45 (see FIGS. 1 and 2) that is bonded to the front part 401 or the rear part 403 passes between the lower end of the first weld 511 and the upper end of the second weld 521. In this case, the intermediate elastic element is also engaged with the first weld 511 and the second weld 521 in the same manner as described above. As a result, it is possible to suppress separation of the intermediate elastic element from the outer covering sheet body 40 and resultant contraction.

In each weld group 54, the upper end of the third weld 531 (i.e., the upper end of the outer edge) is located downward of the upper end of the second weld 521. The upper end of the third weld 531 is also located at approximately the same position in the up-down direction as the lower end of the second weld 521 (i.e., the lower end of the outer edge), or located upward of the lower end of the second weld 521. In the example illustrated in FIG. 6, the upper end of the third weld 531 is located at approximately the same position in the up-down direction as the lower end of the second weld 521.

As illustrated in FIG. 6, in each weld group 54, the lower end of the third weld 531 (i.e., the lower end of the inner edge) is located downward of the lower end of the second weld 521. The lower end of the third weld 531 is also located at approximately the same position in the up-down direction as the upper end of the first weld 511 (i.e., the upper end of the inner edge) in a different weld group 54 that is adjacent below to the weld group 54 concerned, or located downward of the upper end of the first weld 511 in the different weld group 54. In the example illustrated in FIG. 6, the lower end of the third weld 531 in each weld group 54 is located at approximately the same position in the up-down direction as the upper end of the first weld 511 in a different weld group 54 that is adjacent below to the weld group 54 concerned.

Figure 8:
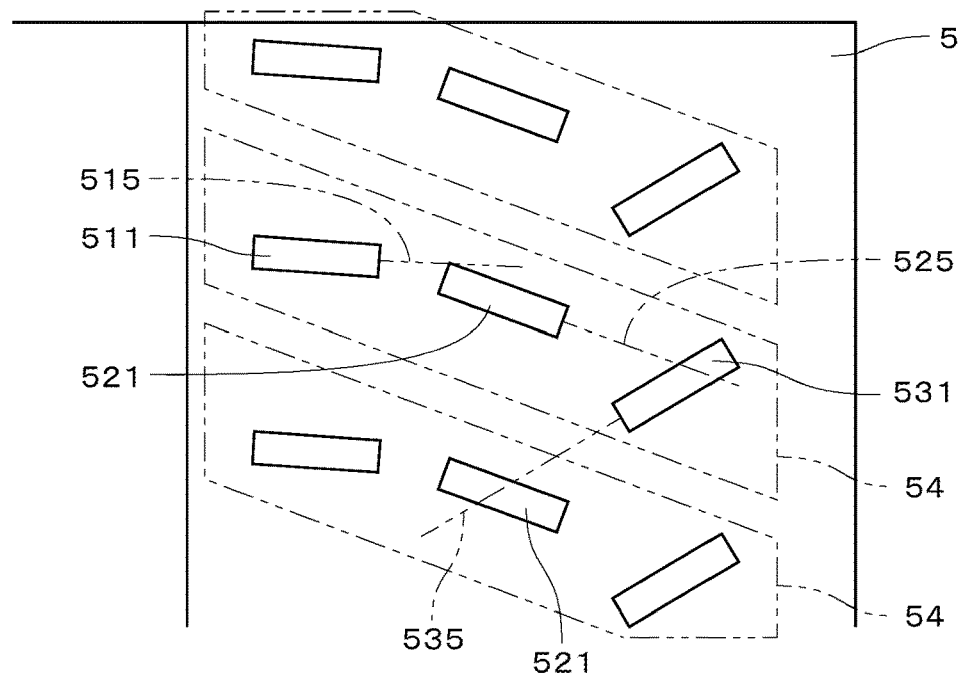
FIG. 8 is an enlarged view of the upper portion of the side seal.

FIG. 8 is a front view illustrating the same area as that illustrated in FIG. 6. As illustrated in FIG. 8, in each weld group 54, an extension line 515 that extends outward in the width direction from the first weld 511 intersects with the second weld 521. The extension line 515 is a virtual straight line that extends outward in the width direction in parallel with the slope of the first weld 511 at the outer end from the center in the up-down direction of the outer edge (i.e., short side) of the first weld 511. In FIG. 8, the extension line 515 of the first weld 511 in the second weld group 54 from above is indicated by a chain double-dashed line. The same applies to extension lines 525 and 535 described below.

In each weld group 54, the extension line 525 that extends outward in the width direction from the second weld 521 intersects with the third weld 531. The extension line 525 is a virtual straight line that extends outward in the width direction in parallel with the slope of the second weld 521 at the outer end from the center in the up-down direction of the side (i.e., short side) of the second weld 521 located outward in the width direction. In each weld group 54, the extension line 535 that extends inward in the width direction from the third weld 531 intersects with the second weld 521 in a different weld group 54 that is adjacent below to the weld group 54 concerned. The extension line 535 is a virtual straight line that extends inward in the width direction in parallel with the slope of the third weld 531 at the inner end from the center in the up-down direction of the inner edge (i.e., short side) of the third weld 531.

Figure 9:
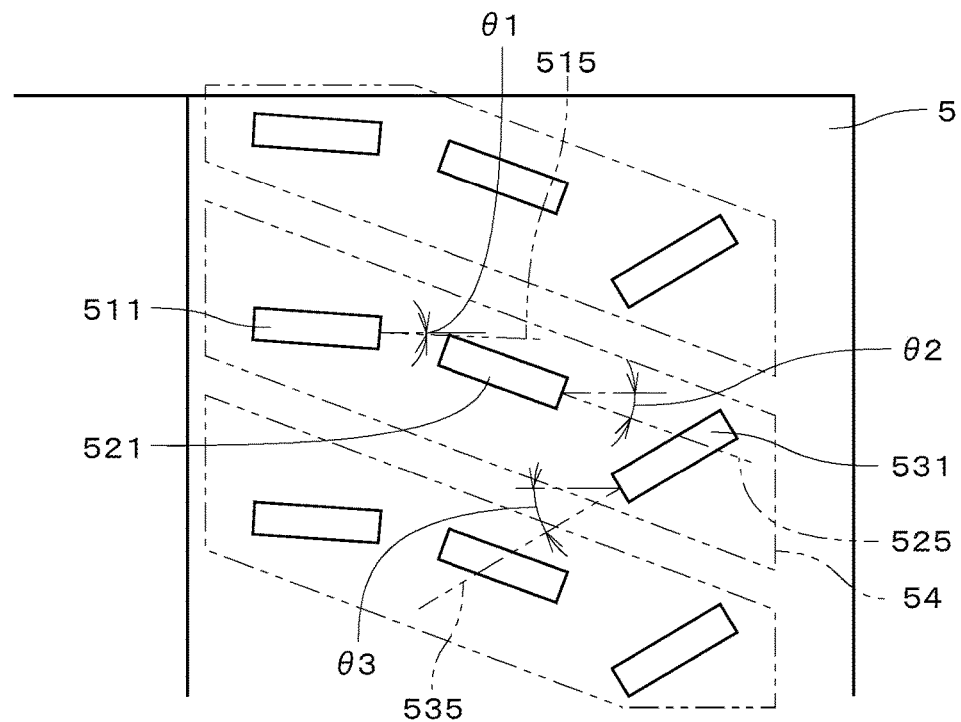
FIG. 9 is an enlarged view of the upper portion of the side seal.

FIG. 9 is a front view illustrating the same area as that illustrated in FIG. 6. As illustrated in FIG. 9, in each weld group 54, an acute angle θ2 formed by the second weld 521 and the width direction is greater than an acute angle θ1 formed by the first weld 511 and the width direction. An acute angle θ3 formed by the third weld 531 and the width direction is greater than the aforementioned acute angle θ2. The acute angle θ1 is the angle formed by the aforementioned extension line 515 of the first weld 511 and the width direction. When the first weld 511 extends approximately parallel to the width direction, the acute angle θ1 is approximately 0°. The acute angle θ2 is the angle formed by the aforementioned extension line 525 of the second weld 521 and the width direction. The acute angle θ3 is the angle formed by the aforementioned extension line 535 of the third weld 531 and the width direction.

Figure 10:
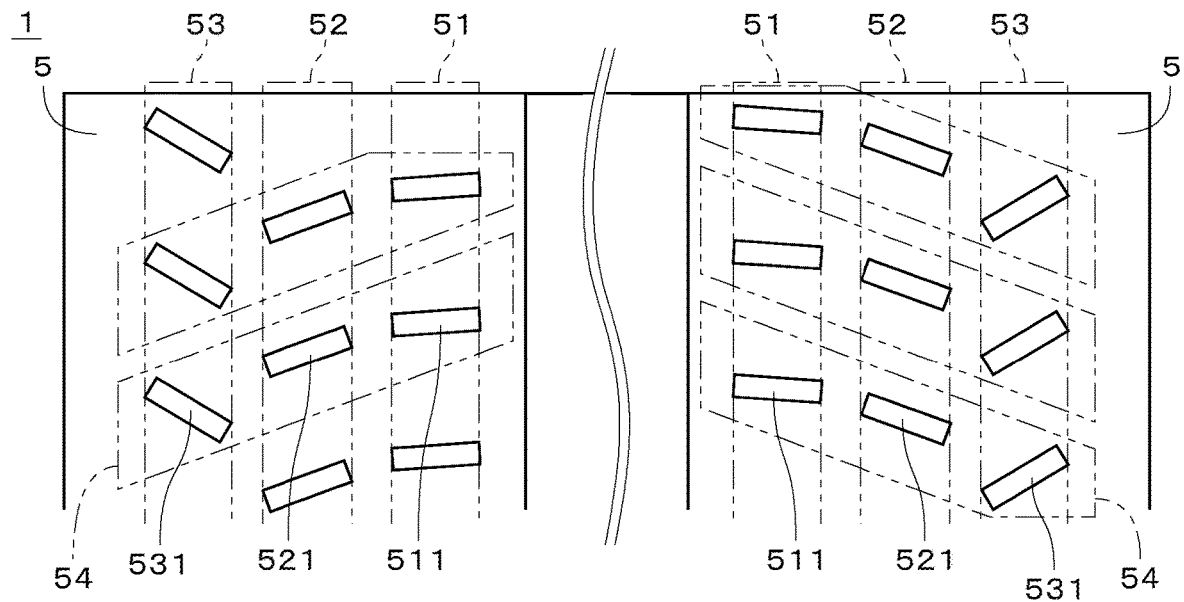
FIG. 10 is an enlarged view of the upper portion of the side seal.

FIG. 10 is a front view illustrating the upper portions of the side seals 5 on both the right and left sides, with the central portion in the width direction of the absorbent product 1 omitted. As illustrated in FIG. 10, the pair of side seals 5 is configured such that a plurality of weld groups 54 of the same shape are arranged while being flipped from side to side. In the pair of side seals 5, a plurality of weld groups 54 in one side seal 5 and a plurality of weld groups 54 in the other side seal 5 are arranged so as to be staggered in the up-down direction. The amount of positional shift in the up-down direction between the weld groups 54 in the one side seal 5 and the weld groups 54 in the other side seal 5 is equal to about a half of the aforementioned weld group pitch.

Focusing now on the first regions 51 in the pair of side seals 5, a plurality of first welds 511 in one side seal 5 and a plurality of first welds 511 in the other side seal 5 are alternately arranged in the up-down direction while being shifted by a distance that is equal to about a half of the weld group pitch. Focusing on the second regions 52 in the pair of side seals 5, a plurality of second welds 521 in the one side seal 5 and a plurality of second welds 521 in the other side seal 5 are alternately arranged in the up-down direction while being shifted by a distance that is equal to about a half of the weld group pitch. Focusing on the third regions 53 in the pair of side seals 5, a plurality of third welds 531 in the one side seal 5 and a plurality of third welds 531 in the other side seal 5 are alternately arranged in the up-down direction while being shifted by a distance that is equal to about a half of the weld group pitch.

In the example illustrated in FIG. 10, the lower ends of the third welds 531 and the upper ends of the first welds 511 in the one side seal 5 and the lower ends of the second welds 521 and the upper ends of the third welds 531 in the other side seal 5 are located at approximately the same position in the up-down direction.

Figure 11:
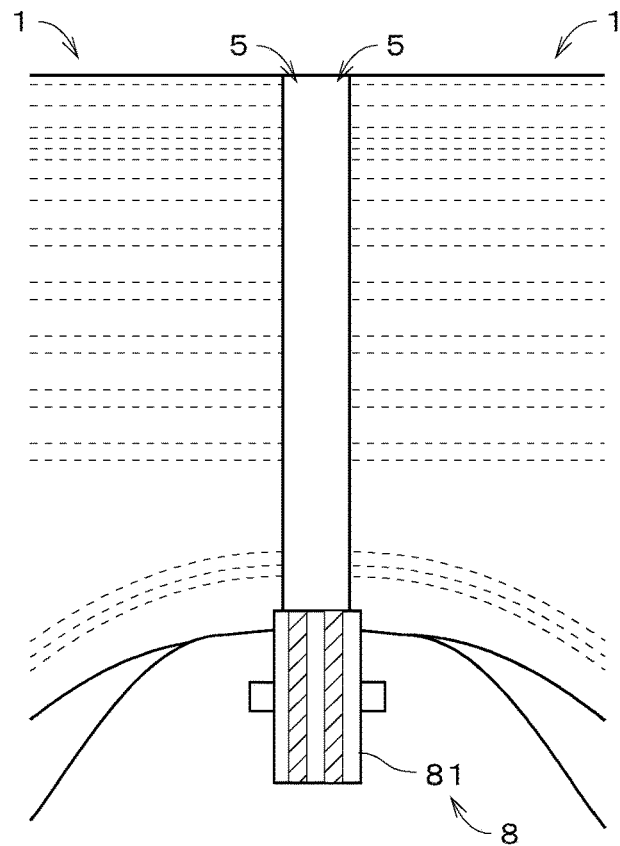
FIG. 11 is a plan view illustrating part of a manufacturing apparatus for manufacturing absorbent products.

FIG. 11 is a plan view illustrating part of a manufacturing apparatus 8 for manufacturing the absorbent products 1. FIG. 11 illustrates an anvil roll 81 that performs bonding of the side seals 5 of each absorbent product 1. FIG. 11 also illustrates part of two absorbent products 1 under manufacture that are disposed at positions facing the anvil roll 81 (i.e., on the back side in a direction perpendicular to the plane of the drawing). The anvil roll 81 is an approximately columnar member that includes protrusions provided on the outer surface in correspondence with a plurality of weld groups 54 (see FIG. 6). On the outer surface of the anvil roll 81, protrusion groups that are in correspondence with the plurality of weld groups 54 are circumferentially arranged on each area on the right and left sides in FIG. 11, and no protrusions are provided on the central portion in the right-left direction. The regions of the anvil roll 81 where the protrusions are arranged are cross-hatched in FIG. 11. On the opposite side of the anvil roll 81 with the absorbent products 1 sandwiched in between, an approximately cylindrical drum (not shown) is arranged such that a plurality of absorbent products 1 under manufacture are held in a continuous sequence on the outer surface of the drum. In the present embodiment, a plurality of (e.g., six) anvil rolls 81 are arranged at approximately regular intervals in a circumferential direction along the outer surface of the drum so as to each face the side seals 5 of the absorbent products 1. These anvil rolls 81 are of the same shape. Inside the drum, a plurality of ultrasonic horns are provided at positions opposing the plurality of anvil rolls 81. The anvil rolls 81 rotate in synchronization with the rotation of the drum.

The absorbent products 1 under manufacture arranged in a continuous sequence are transported from the right side to the left side in FIG. 11 by the rotation of the aforementioned drum. The side seals 5 of these absorbent products 1 are not bonded, and the side seals 5 of each pair of absorbent products 1 are contiguous to each other in the width direction. Since each anvil roll 81 moves together with the absorbent products 1, the circumferential position of each anvil roll 81 relative to the side seals 5 remains constant. When the anvil roll 81 is pressed against the side seals 5 of two absorbent products 1, the anvil roll 81 moves from the lower side to the upper side in FIG. 11, or from the upper side to the lower side, while rotating about a rotation shaft pointing in the right-left direction in FIG. 11. Accordingly, the right side seal 5 of the left absorbent product 1 and the left side seal 5 of the right absorbent product 1 in FIG. 11 are bonded together by ultrasonic sealing. In the same manner as described above, the side seals 5 of the other absorbent products 1 held on the aforementioned drum are also bonded by means of the other anvil rolls 81.

In this way, the manufacturing apparatus 8 uses the protrusion groups provided on the right side of each anvil roll 81 for the bonding of one of the pair of side seals 5 of each absorbent product 1 and uses the protrusion groups provided on the left side of the anvil roll 81 for the bonding of the other side seal 5.

Figure 12:
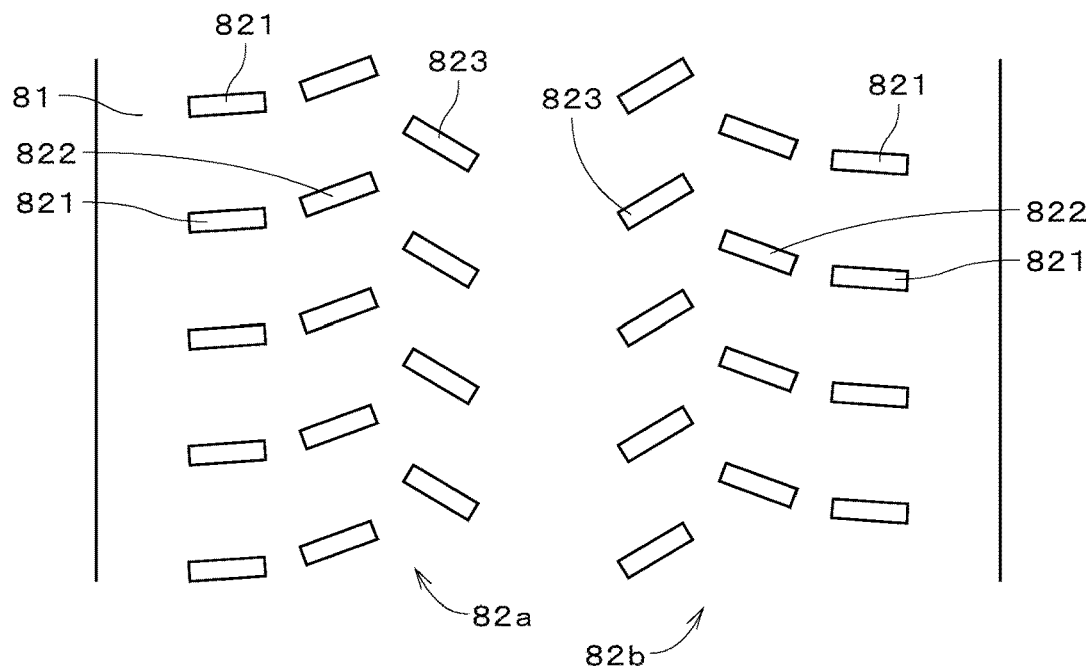
FIG. 12 is an enlarged developed view illustrating part of an outer surface of an anvil roll.

FIG. 12 is an enlarged view of part of the outer surface of one anvil roll 81. In FIG. 12, the area of the cylindrical outer surface of the anvil roll 81 on the front side in FIG. 11 is illustrated by being developed in a plane. Thus, the arrangement of later-described protrusions of the anvil roll 81 in FIG. 12 is vertically opposite to the arrangement of the first welds 511, the second welds 521, and the third welds 531 in the side seal 5 described above. In the absorbent product 1, the right side seal 5 (see FIG. 6) includes the first welds 511, the second welds 521, and the third welds 531 arranged as described above. Thus, in a protrusion group 82a on the left side of the anvil roll 81, the right ends of first protrusions 821 that correspond to the first welds 511 partially overlap second protrusions 822 that correspond to the second welds 521 in the right-left direction in which the rotation shaft of the anvil roll 81 extends (hereinafter, also referred to as the "axial direction"). In other words, when viewed in the axial direction, the right ends of the first protrusions 821 partially overlap the second protrusions 822 in the axial direction. The right ends of the second protrusions 822 partially overlap third protrusions 823 that correspond to the third welds 531 in the axial direction. The left ends of the third protrusions 823 partially overlap the first protrusions 821 in the axial direction.

In this way, in the protrusion group 82a, at least one of a first protrusion 821, a second protrusion 822, and a third protrusion 823 is present on a straight line extending in the axial direction at every circumferential position of the anvil roll 81. In other words, in the protrusion group 82a, the first protrusions 821, the second protrusions 822, and the third protrusions 823 are continuously present along the entire circumference of the anvil roll 81. If the productions in the protrusion group 82a are partly discontinuous in the circumferential direction, the pressing force of the anvil roll 81 that presses the side seals 5 while rotating may fluctuate greatly when the portion where the protrusions are discontinuous faces the side seals 5. In other words, line loads of the anvil roll 81 may become zero in the portions where the protrusions are discontinuous. On the other hand, in the protrusion group 82a on the left side of the anvil roll 81 illustrated in FIG. 12, the first protrusions 821, the second protrusions 822, and the third protrusions 823 are contiguous in the circumferential direction as described above. This prevents the pressing force of the anvil roll 81 applied to the side seals 5 from fluctuating greatly during the bonding of the side seals 5.

In a protrusion group 82b on the right side of the anvil roll 81, approximately as in the protrusion group 82a on the left side, the left ends of the first protrusions 821 partially overlap the second protrusions 822 in the axial direction, the left ends of the second protrusions 822 partially overlap the third protrusion 823 in the axial direction, and the right ends of the third protrusions 823 partially overlap the first protrusion 821 in the axial direction. In this way, in the protrusion group 82b on the right side of the anvil roll 81, the first protrusions 821, the second protrusions 822, and the third protrusions 823 are continuously present along the entire circumference of the anvil roll 81. This prevents the pressing force of the anvil roll 81 applied to the side seals 5 from fluctuating greatly during the bonding of the side seals 5.

In the absorbent product 1, as described above, a plurality of weld groups 54 in one side seal 5 and a plurality of weld groups 54 in the other side seal 5 are arranged while being shifted in the up-down direction. Therefore, the protrusion group 82a of the anvil roll 81 is arranged while being shifted in the circumferential direction from the protrusion group 82b. The amount of positional shift in the circumferential direction between the protrusion group 82a and the protrusion group 82b is equal to about a half of the aforementioned weld group pitch. This more reliably prevents portions where the protrusions are discontinuous from being generated along the entire circumference of the anvil roll 81. As a result, it is possible to further suppress fluctuations in the pressing force of the anvil roll 81 applied to the side seals 5 during the bonding of the side seals 5.

As described thus far, the absorbent product 1 is a pants-type disposable absorbent product having the waist opening 11 at the upper end and the pair of leg openings 12 at the bottom. The absorbent product 1 includes the front part 401, the crotch part 402, the rear part 403, and the pair of side seals 5. The front part 401 is positioned on the wearer's belly side. The rear part 403 is positioned on the wearer's back side. The crotch part 402 is contiguous to the front part 401 and the rear part 403. The pair of side seals 5 is formed by bonding the both ends in the width direction of the front part 401 and the both ends in the width direction of the rear part 403 together. Each of the pair of side seals 5 is a strip area extending in the up-down direction.

Each of the pair of side seals 5 includes the first region 51, the second region 52, and the third region 53. The first region 51 is a strip region extending in the up-down direction. The first region 51 includes a plurality of first welds 511 aligned away from each other in the up-down direction. The second region 52 is a strip region extending in the up-down direction and arranged adjacent to and outward of the first region 51 in the width direction. The second region 52 includes a plurality of second welds 521 aligned away from each other in the up-down direction. The third region 53 is a strip region extending in the up-down direction and arranged adjacent to and outward of the second region 52 in the width direction. The third region 53 includes a plurality of third welds 531 aligned away from each other in the up-down direction. The first welds 511, the second welds 521, and the third welds 531 are discontinuous.

The first welds 511 each extend parallel to the width direction or slope downward toward the outer side in the width direction. The second welds 521 each slope downward toward the outer side in the width direction. The third welds 531 each slope upward toward the outer side in the width direction. When one first weld 511, one second weld 521, and one third weld 531 that are adjacent to one another in the width direction form one weld group 54, each of the pair of side seals 5 includes a plurality of weld groups 54 aligned in the up-down direction.

In each of the weld groups 54, the upper end of the third weld 531 is located downward of the upper end of the second weld 521, the upper end of the second weld 521 is located downward of the upper end of the first weld 511, the lower end of the second weld 521 is located downward of the lower end of the first weld 511, and the extension line 525 extending outward in the width direction from the second weld 521 intersects with the third weld 531.

Accordingly, when the side seals 5 are torn off from the waist opening 11 toward the bottom, the force applied at the start of tearing is easily transmitted outward in the width direction along the first welds 511. This facilitates the tearing of the upper ends of the side seals 5 toward the outer side in the width direction. Accordingly, it becomes easy to start the tearing of the side seals 5. The force transmitted outward in the width direction along the first welds 511 (i.e., tearing force) is transmitted obliquely downward along the second welds 521. This allows the rupture of the side seals 5 to be easily transmitted downward.

Moreover, the tearing force transmitted obliquely downward toward the outer side in the width direction along the second welds 521 reaches the third welds 531 and changes its direction to an obliquely downward direction toward the inner side in the width direction along the third welds 531. This reduces the possibility that the tearing force transmitted along the second welds 521 may be lost to the outer edges in the width direction of the side seals 5 and accordingly the rupture of the side seals 5 may be interrupted. The aforementioned tearing force is also transmitted obliquely downward toward the inner side in the width direction along the third welds 531. This allows the rupture of the side seals 5 to be easily transmitted further downward. As a result, it is possible to easily tear off the side seals 5 from the upper end toward the bottom.

As described above, in each of the weld groups 54, the acute angle θ2 formed by the second weld 521 and the width direction is greater than the acute angle θ1 formed by the first weld 511 and the width direction. This allows the tearing force applied from the inside in the width direction to the upper ends of the side seals 5 to be easily transmitted outward in the width direction along the first welds 511. Besides, the tearing force transmitted along the first welds 511 is efficiently guided downward along the second welds 521. This facilitates the downward transmission of the rupture of the side seals 5. As a result, it is possible to more easily tear off the side seals 5 from the upper end.

As described above, in each of the weld groups 54, the acute angle θ3 formed by the third weld 531 and the width direction is greater than the acute angle θ2 formed by the second weld 521 and the width direction. This further reduces the possibility that the tearing force transmitted from the second weld 521 to the third weld 531 may be lost to the outer edge in the width direction of the side seal 5 and accordingly the rupture of the side seal 5 may be interrupted. Moreover, the tearing force transmitted along the second welds 521 is efficiently guided downward along the third welds 531. This facilitates the downward transmission of the rupture of the side seals 5.

As described above, in each of the weld groups 54, it is preferable that the extension line 515 extending outward in the width direction from the first weld 511 may intersect with the second weld 521. This allows the tearing force transmitted outward in the width direction from the first weld 511 to be easily transmitted to the second weld 521 and reduces the possibility that the tearing force may be transmitted outward of the second weld 521 in the width direction and lost from the outer edge of the side seal 5 Accordingly, it is possible to facilitate the downward transmission of the rupture of the side seals 5.

As described above, in each weld group 54, it is preferable that the extension line 535 extending inward in the width direction from the third weld 531 may preferably intersect with the second weld 521 in a different weld group 54 that is adjacent below to the weld group 54 concerned. This allows the tearing force transmitted obliquely downward from the third weld 531 toward the inner side in the width direction to be easily transmitted to the second weld 521 and reduces the possibility that the tearing force may be transmitted inward of the second weld 521 in the width direction and lost from the inner edge of the side seal 5. Accordingly, it is possible to facilitate the downward transmission of the rupture of the side seals 5.

As described above, in each of the weld groups 54, it is preferable that the upper end of the second weld 521 may be located at the same position in the up-down direction as the lower end of the first weld 511, or located upward of the lower end of the first weld 511. Accordingly, in each weld group 54, the first weld 511 and the second weld 521 partially overlap in the up-down direction. This increases the bonding strength of the side seals 5 (i.e., the bonding strength of the front part 401 and the rear part 403 across the entire side seals 5). Moreover, as described above, it is possible to reduce the possibility that the pressing force of the anvil roll 81 applied to the side seals 5 may fluctuate between the first protrusions 821 and the second protrusions 822 when the side seals 5 are bonded together by the anvil roll 81 illustrated in FIGS. 11 and 12. As a result, it is possible to suppress local fluctuations in the bonding strength of the side seals 5 and to improve the quality of bonding of the side seals 5.

As described above, it is preferable that the end portion in the width direction of an elastic member (in the above-described example, the waist elastic member 44 and/or the intermediate elastic member 45) that is bonded to the front part 401 or the rear part 403 in the width direction and contracts to form gathers passes between the lower end of the first weld 511 and the upper end of the second weld 521 in one weld group 54 among the plurality of weld groups 54. Accordingly, as illustrated in FIG. 7, the end portion of the elastic member is engaged with the first weld 511 and the second weld 521. As a result, it is possible to suppress separation of the elastic member from the outer covering sheet body 40 and resultant contraction. As described above, in the case where the side seals 5 are bonded together by ultrasonic sealing, the elastic members are likely to be moved by ultrasonic vibrations during bonding to the positions where they can avoid the welds. This facilitates the engagement of the end portions of the elastic members with the first welds 511 and the second welds 521.

As described above, in each of the weld groups 54, it is preferable that the upper end of the third weld 531 is located at the same position in the up-down direction as the lower end of the second weld 521, or located upward of the lower end of the second weld 521. In this case, in each weld group 54, the second weld 521 and the third weld 531 partially overlap in the up-down direction. This increases the bonding strength of the side seals 5. Besides, as described above, it is possible to reduce the possibility that the pressing force of the anvil roll 81 applied to the side seals 5 may fluctuate between the second protrusions 822 and the third protrusions 823 when the side seals 5 are bonded together by the anvil roll 81. As a result, it is possible to suppress local fluctuations in the bonding strength of the side seals 5 and to improve the quality of bonding of the side seals 5.

As described above, in each weld group 54, it is preferable that the lower end of the third weld 531 is located at the same position in the up-down direction as the upper end of the first weld 511 in a different weld group 54 that is adjacent below to the weld group 54 concerned, or located downward of the upper end of the first weld 511 in the different weld group 54. Accordingly, the third welds 531 and the first welds 511 partially overlap in the up-down direction in each pair of weld groups 54 that are adjacent to each other in the up-down direction. This increases the bonding strength of the side seals 5. Besides, as described above, it is possible to reduce the possibility that the pressing force of the anvil roll 81 applied to the side seals 5 may fluctuate between the third protrusions 823 and the first protrusions 821 when the side seals 5 are bonded together by the anvil roll 81. As a result, it is possible to suppress local fluctuations in the bonding strength of the side seals 5 and to improve the quality of bonding of the side seals 5.

As described above, it is preferable that the non-welded regions 541 and 542 extending continuously in the up-down direction may be provided in the width direction between the first welds 511 and the second welds 521 and between the second welds 521 and the third welds 531, respectively. This suppresses an excessive increase in the total area of the welds in the side seals 5 and to suppress an excessive increase in the amount of heat input to the side seals 5. As a result, it is possible to improve the quality of bonding of the side seals 5. Besides, it is possible to facilitate the tearing of the side seals 5 in the up-down direction. Moreover, it is possible to improve the flexibility of the side seals 5 and to improve inside touches of the side seals 5 that come in contact with the wearer. Besides, in the anvil roll 81 of the manufacturing apparatus 8 described above, appropriate clearance is provided between the first protrusions 821 and the second protrusions 822 and between the second protrusions 822 and the third protrusions 823. This facilitates the manufacture of the anvil roll 81.

As described above, it is preferable that the first welds 511 are aligned at a constant pitch in the up-down direction. It is also preferable that the second welds 521 are aligned at a constant pitch in the up-down direction. It is also preferable that the third welds 531 are aligned at a constant pitch in the up-down direction. This allows equalization of the bonding strength of the side seals 5 in the up-down direction. As a result, it is possible to reduce the possibility that part of the side seals 5 in the up-down direction may be torn off against intension.

As described above, the pair of side seals 5 is preferably configured such that the first welds 511 in one side seal 5 and the first welds 511 in the other side seal 5 are alternately arranged in the up-down direction. It is also preferable that the second welds 521 in the one side seal 5 and the second welds 521 in the other side seal 5 are alternately arranged in the up-down direction. It is also preferable that the third welds 531 in the one side seal 5 and the third welds 531 in the other side seal 5 are alternately arranged in the up-down direction. As described above, this further reduces the possibility that the pressing force of the anvil roll 81 applied to the side seals 5 may fluctuate when the side seals 5 are bonded together by the anvil roll 81. As a result, it is possible to further improve the quality of bonding of the side seals 5.

From the viewpoint of suppressing fluctuations in the pressing force of the anvil roll 81 applied to the side seals 5, it is preferable that the amount of positional shift in the up-down direction between the weld groups 54 in one of the side seals 5 and the weld groups 54 in the other side seal 5 is equal to about a half of the aforementioned weld group pitch. It is also preferable that the lower ends of the third welds 531 and the upper ends of the first welds 511 in the one side seal 5 and the lower ends of the second welds 521 and the upper ends of the third welds 531 in the other side seal 5 are located at approximately the same position in the up-down direction.

The absorbent product 1 and the manufacturing apparatus 8 described above may be modified in various ways.

For example, the weld groups 54 in one of the side seals 5 and the weld groups 54 in the other side seal 5 may be arranged at the same level in the up-down direction.

The first welds 511 do not necessarily have to be aligned at a constant pitch. The second welds 521 also do not necessarily have to be aligned at a constant pitch. The third welds 531 also do not necessarily have to be aligned at a constant pitch.

The non-welded region 541 provided between the first welds 511 and the second welds 521 may be omitted. The non-welded region 542 provided between the second welds 521 and the third welds 531 may also be omitted.

The lower end of the third weld 531 in one weld group 54 may be located upward of the upper end of the first weld 511 in a different weld group 54 that is adjacent below to the weld group 54 concerned.

In one weld group 54, the upper end of the third weld 531 may be located downward of the lower end of the second weld 521. Moreover, the upper end of the second weld 521 may be located downward of the lower end of the first weld 511. The end portions of the waist elastic member 44 and the intermediate elastic member 45 do not necessarily have to pass between the lower end of the first weld 511 and the upper end of the second weld 521 in one weld group 54.

In one weld group 54, the extension line 535 extending inward in the width direction from the third weld 531 does not necessarily have to intersect with the second weld 521.

In one weld group 54, the acute angle θ3 formed by the third weld 531 and the width direction may be less than or equal to the acute angle θ2 formed by the second weld 521 and the width direction. The acute angle θ2 may also be less than or equal to the acute angle θ1 formed by the first weld 511 and the width direction.

Each side seal 5 may include a plurality of different welds that are aligned in the up-down direction and located inward of the first region 51 in the width direction. Each side seal 5 may also include a plurality of different welds that are aligned in the up-down direction and located outward of the third region 53 in the width direction.

Each first weld 511 may be separated into a plurality of elements at any position in the width direction. The same applies to the second welds 521 and the third welds 531.

The manufacturing apparatus 8 may bond the side seals 5 together by heat sealing using the anvil roll 81. The method of bonding the side seals 5 is not limited to the method using the anvil roll 81 and the aforementioned drum, and may be modified in various ways.

The absorbent product 1 may be a pants-type disposable diaper for children. The aforementioned structure of the absorbent product 1 may be used for different pants-type disposable absorbent products other than disposable diapers.

The configurations of the above-described preferred embodiment and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention.

REFERENCE SIGNS LIST 1 absorbent product
5 side seal
11 waist opening
12 leg opening
44 waist elastic member
45 intermediate elastic member
51 first region
52 second region
53 third region
54 weld group
401 front part
402 crotch part
403 rear part
511 first weld
515, 525, 535 extension line
521 second weld
531 third weld
541, 542 non-welded region
θ1, θ2, θ3 acute angle

The invention claimed is:

1. A disposable absorbent pants product having a waist opening at an upper end and leg openings at a bottom, the disposable absorbent pants product comprising:
   a front part configured to be positioned on a belly side of a wearer;
   a rear part configured to be positioned on a back side of the wearer;
   a crotch part that is continuous with the front part and the rear part; and
   side seals, each of the side seals being: (i) a strip area extending in an up-down direction, and (ii) defined by a bond between an end of the front part in a width direction and an end of the rear part in the width direction,
   wherein each of the side seals includes:
   a first region that is a strip region extending in the up-down direction and including first welds aligned in the up-down direction and separate from each other;
   a second region that is a strip region extending in the up-down direction and being adjacent to and outward of the first region in the width direction, the second region including second welds aligned in the up-down direction and separate from each other; and
   a third region that is a strip region extending in the up-down direction and being adjacent to and outward of the second region in the width direction, the third region including third welds aligned in the up-down direction and separate from each other,
   wherein:
   the first welds, the second welds, and the third welds are discontinuous;
   each of the first welds extends parallel to the width direction or slopes downward toward an outer side in the width direction;
   each of the second welds slopes downward toward the outer side in the width direction;
   each of the third welds slopes upward toward the outer side in the width direction;
   each of the side seals includes weld groups aligned in the up-down direction, each of the weld groups including one of the first welds, one of the second welds, and one of the third welds that are adjacent to each other in the width direction;

in each of the weld groups, an upper end of the third weld is located downward with respect to an upper end of the second weld, the upper end of the second weld is located downward with respect to an upper end of the first weld, a lower end of the second weld is located downward with respect to a lower end of the first weld, and an extension line of the second weld intersects with the third weld, the extension line of the second weld being a virtual straight line that extends outward from an outer edge of the second weld in parallel with a slope at an outer end of the second weld; and in each of the weld groups, a second acute angle defined by the second weld and the width direction is greater than a first acute angle defined by the first weld and the width direction.

2. The disposable absorbent pants product according to claim 1, wherein in each of the weld groups, an extension line of the first weld intersects with the second weld, the extension line of the first weld being a virtual straight line that extends outward from an outer edge of the first weld in parallel with a slope at an outer end of the first weld.

3. The disposable absorbent pants product according to claim 1, wherein in each of the weld groups, the upper end of the second weld is located: (i) at a same position in the up-down direction as the lower end of the first weld; or (ii) upward with respect to the lower end of the first weld.

4. The disposable absorbent pants product according to claim 1, wherein in each of the weld groups, the upper end of the third weld is located: (i) at a same position in the up-down direction as the lower end of the second weld; or (ii) upward with respect to the lower end of the second weld.

5. The disposable absorbent pants product according to claim 1, wherein in one of the weld groups, a lower end of the third weld is located: (i) at a same position in the up-down direction as the upper end of the first weld in another of the weld groups that is adjacent below to the one of the weld groups; or (ii) downward with respect to the upper end of the first weld in the other of the weld groups.

6. The disposable absorbent pants product according to claim 1, further comprising a non-welded region that extends continuously in the up-down direction, the non-welded region being located: (i) between the first welds and the second welds in the width direction; or (ii) between the second welds and the third welds in the width direction.

7. A disposable absorbent pants product having a waist opening at an upper end and leg openings at a bottom, the disposable absorbent pants product comprising:

a front part configured to be positioned on a belly side of a wearer;

a rear part configured to be positioned on a back side of the wearer;

a crotch part that is continuous with the front part and the rear part; and side seals, each of the side seals being: (i) a strip area extending in an up-down direction, and (ii) defined by a bond between an end of the front part in a width direction and an end of the rear part in the width direction, wherein each of the side seals includes:

a first region that is a strip region extending in the up-down direction and including first welds aligned in the up-down direction and separate from each other;

a second region that is a strip region extending in the up-down direction and being adjacent to and outward of the first region in the width direction, the second region including second welds aligned in the up-down direction and separate from each other; and a third region that is a strip region extending in the up-down direction and being adjacent to and outward of the second region in the width direction, the third region including third welds aligned in the up-down direction and separate from each other, wherein:

the first welds, the second welds, and the third welds are discontinuous;

each of the first welds extends parallel to the width direction or slopes downward toward an outer side in the width direction;

each of the second welds slopes downward toward the outer side in the width direction;

each of the third welds slopes upward toward the outer side in the width direction;

each of the side seals includes weld groups aligned in the up-down direction, each of the weld groups including one of the first welds, one of the second welds, and one of the third welds that are adjacent to each other in the width direction;

in each of the weld groups, an upper end of the third weld is located downward with respect to an upper end of the second weld, the upper end of the second weld is located downward with respect to an upper end of the first weld, a lower end of the second weld is located downward with respect to a lower end of the first weld, and an extension line of the second weld intersects with the third weld, the extension line of the second weld being a virtual straight line that extends outward from an outer edge of the second weld in parallel with a slope at an outer end of the second weld; and in each of the weld groups, a third acute angle defined by the third weld and the width direction is greater than a second acute angle defined by the second weld and the width direction.

8. A disposable absorbent pants product having a waist opening at an upper end and leg openings at a bottom, the disposable absorbent pants product comprising:

a front part configured to be positioned on a belly side of a wearer;

a rear part configured to be positioned on a back side of the wearer;

a crotch part that is continuous with the front part and the rear part; and side seals, each of the side seals being: (i) a strip area extending in an up-down direction, and (ii) defined by a bond between an end of the front part in a width direction and an end of the rear part in the width direction, wherein each of the side seals includes:

a first region that is a strip region extending in the up-down direction and including first welds aligned in the up-down direction and separate from each other;

a second region that is a strip region extending in the up-down direction and being adjacent to and outward of the first region in the width direction, the second region including second welds aligned in the up-down direction and separate from each other; and a third region that is a strip region extending in the up-down direction and being adjacent to and outward of the second region in the width direction, the third region including third welds aligned in the up-down direction and separate from each other, wherein:

the first welds, the second welds, and the third welds are discontinuous;

each of the first welds extends parallel to the width direction or slopes downward toward an outer side in the width direction;

each of the second welds slopes downward toward the outer side in the width direction;

each of the third welds slopes upward toward the outer side in the width direction;

each of the side seals includes weld groups aligned in the up-down direction, each of the weld groups including one of the first welds, one of the second welds, and one of the third welds that are adjacent to each other in the width direction;

in each of the weld groups, an upper end of the third weld is located downward with respect to an upper end of the second weld, the upper end of the second weld is located downward with respect to an upper end of the first weld, a lower end of the second weld is located downward with respect to a lower end of the first weld, and an extension line of the second weld intersects with the third weld, the extension line of the second weld being a virtual straight line that extends outward from an outer edge of the second weld in parallel with a slope at an outer end of the second weld; and in one of the weld groups, an extension line of the third weld intersects with the second weld in another of the weld groups that is adjacent below to the one of the weld groups, the extension line of the third weld being a virtual straight line that extends inward from an inner edge of the third weld in parallel with a slope at an inner end of the third weld.

9. A disposable absorbent pants product having a waist opening at an upper end and leg openings at a bottom, the disposable absorbent pants product comprising:

a front part configured to be positioned on a belly side of a wearer;

a rear part configured to be positioned on a back side of the wearer;

a crotch part that is continuous with the front part and the rear part;

side seals, each of the side seals being: (i) a strip area extending in an up-down direction, and (ii) defined by a bond between an end of the front part in a width direction and an end of the rear part in the width direction; and an elastic member, wherein each of the side seals includes:

a first region that is a strip region extending in the up-down direction and including first welds aligned in the up-down direction and separate from each other;

a second region that is a strip region extending in the up-down direction and being adjacent to and outward of the first region in the width direction, the second region including second welds aligned in the up-down direction and separate from each other; and a third region that is a strip region extending in the up-down direction and being adjacent to and outward of the second region in the width direction, the third region including third welds aligned in the up-down direction and separate from each other, wherein:

the first welds, the second welds, and the third welds are discontinuous;

each of the first welds extends parallel to the width direction or slopes downward toward an outer side in the width direction;

each of the second welds slopes downward toward the outer side in the width direction;

each of the third welds slopes upward toward the outer side in the width direction;

each of the side seals includes weld groups aligned in the up-down direction, each of the weld groups including one of the first welds, one of the second welds, and one of the third welds that are adjacent to each other in the width direction;

in each of the weld groups, an upper end of the third weld is located downward with respect to an upper end of the second weld, the upper end of the second weld is located downward with respect to an upper end of the first weld, a lower end of the second weld is located downward with respect to a lower end of the first weld, and an extension line of the second weld intersects with the third weld, the extension line of the second weld being a virtual straight line that extends outward from an outer edge of the second weld in parallel with a slope at an outer end of the second weld;

in each of the weld groups, the upper end of the second weld is located: (i) at a same position in the up-down direction as the lower end of the first weld; or (ii) upward with respect to the lower end of the first weld; and an end portion of the elastic member in the width direction passes between the lower end of the first weld and the upper end of the second weld in one of the weld groups, the elastic member being bonded to the front part or the rear part in the width direction and configured to contract so as to define a gather.

10. A disposable absorbent pants product having a waist opening at an upper end and leg openings at a bottom, the disposable absorbent pants product comprising:

a front part configured to be positioned on a belly side of a wearer;

a rear part configured to be positioned on a back side of the wearer;

a crotch part that is continuous with the front part and the rear part; and side seals, each of the side seals being: (i) a strip area extending in an up-down direction, and (ii) defined by a bond between an end of the front part in a width direction and an end of the rear part in the width direction, wherein each of the side seals includes:

a first region that is a strip region extending in the up-down direction and including first welds aligned in the up-down direction and separate from each other;

a second region that is a strip region extending in the up-down direction and being adjacent to and outward of the first region in the width direction, the second region including second welds aligned in the up-down direction and separate from each other; and a third region that is a strip region extending in the up-down direction and being adjacent to and outward of the second region in the width direction, the third region including third welds aligned in the up-down direction and separate from each other, wherein:

the first welds, the second welds, and the third welds are discontinuous;

each of the first welds extends parallel to the width direction or slopes downward toward an outer side in the width direction;

each of the second welds slopes downward toward the outer side in the width direction;

each of the third welds slopes upward toward the outer side in the width direction;

each of the side seals includes weld groups aligned in the up-down direction, each of the weld groups including one of the first welds, one of the second welds, and one of the third welds that are adjacent to each other in the width direction;

in each of the weld groups, an upper end of the third weld is located downward with respect to an upper end of the second weld, the upper end of the second weld is located downward with respect to an upper end of the first weld, a lower end of the second weld is located downward with respect to a lower end of the first weld, and an extension line of the second weld intersects with the third weld, the extension line of the second weld being a virtual straight line that extends outward from an outer edge of the second weld in parallel with a slope at an outer end of the second weld;

the first welds are aligned at a constant first pitch in the up-down direction;

the second welds are aligned at a constant second pitch in the up-down direction; and the third welds are aligned at a constant third pitch in the up-down direction.

11. A disposable absorbent pants product having a waist opening at an upper end and leg openings at a bottom, the disposable absorbent pants product comprising:

a front part configured to be positioned on a belly side of a wearer;

a rear part configured to be positioned on a back side of the wearer;

a crotch part that is continuous with the front part and the rear part; and side seals, each of the side seals being: (i) a strip area extending in an up-down direction, and (ii) defined by a bond between an end of the front part in a width direction and an end of the rear part in the width direction, wherein each of the side seals includes:

a first region that is a strip region extending in the up-down direction and including first welds aligned in the up-down direction and separate from each other;

a second region that is a strip region extending in the up-down direction and being adjacent to and outward of the first region in the width direction, the second region including second welds aligned in the up-down direction and separate from each other; and a third region that is a strip region extending in the up-down direction and being adjacent to and outward of the second region in the width direction, the third region including third welds aligned in the up-down direction and separate from each other, wherein:

the first welds, the second welds, and the third welds are discontinuous;

each of the first welds extends parallel to the width direction or slopes downward toward an outer side in the width direction;

each of the second welds slopes downward toward the outer side in the width direction;

each of the third welds slopes upward toward the outer side in the width direction;

each of the side seals includes weld groups aligned in the up-down direction, each of the weld groups including one of the first welds, one of the second welds, and one of the third welds that are adjacent to each other in the width direction;

in each of the weld groups, an upper end of the third weld is located downward with respect to an upper end of the second weld, the upper end of the second weld is located downward with respect to an upper end of the first weld, a lower end of the second weld is located downward with respect to a lower end of the first weld, and an extension line of the second weld intersects with the third weld, the extension line of the second weld being a virtual straight line that extends outward from an outer edge of the second weld in parallel with a slope at an outer end of the second weld;

the first welds in one of the side seals and the first welds in another of the side seals are alternately arranged in the up-down direction;

the second welds in the one of the side seals and the second welds in the other of the side seals are alternately arranged in the up-down direction; and the third welds in the one of the side seals and the third welds in the other of the side seals are alternately arranged in the up-down direction.

* * * * *